(12) United States Patent
Yamada et al.

(10) Patent No.: US 8,240,050 B2
(45) Date of Patent: Aug. 14, 2012

(54) MANUFACTURING METHOD OF HEAT EQUALIZING MEMBER FOR FIXING DEVICE AND HEAT EQUALIZING MEMBER FOR FIXING DEVICE

(75) Inventors: Tetsuya Yamada, Shinshiro (JP); Etsuaki Urano, Okazaki (JP); Osamu Morita, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 502 days.

(21) Appl. No.: 12/480,832

(22) Filed: Jun. 9, 2009

(65) Prior Publication Data
US 2009/0314478 A1 Dec. 24, 2009

(30) Foreign Application Priority Data

| Jun. 18, 2008 | (JP) | ................. | 2008-159286 |
| Sep. 1, 2008 | (JP) | ................. | 2008-223149 |
| Sep. 18, 2008 | (JP) | ................. | 2008-239538 |
| Dec. 15, 2008 | (JP) | ................. | 2008-318328 |

(51) Int. Cl.
B23P 6/00 (2006.01)
(52) U.S. Cl. ................................................ 29/890.032
(58) Field of Classification Search .............. 29/890.032
See application file for complete search history.

(56) References Cited

U.S. PATENT DOCUMENTS

| 4,977,431 A | 12/1990 | Fuji |
| 5,403,995 A * | 4/1995 | Kishino et al. ................. 219/216 |
| 5,426,495 A | 6/1995 | Sawamura et al. |
| 6,132,815 A * | 10/2000 | Takahashi et al. ............ 427/553 |
| 6,183,869 B1 * | 2/2001 | Okuda et al. ................ 428/411.1 |
| 6,445,902 B1 | 9/2002 | Hirst et al. |
| 6,477,350 B1 | 11/2002 | Nishimura |
| 6,847,798 B2 * | 1/2005 | Cho et al. ...................... 399/330 |
| 6,911,240 B2 * | 6/2005 | Kondoh ...................... 428/35.9 |
| 7,257,361 B2 | 8/2007 | Takagi et al. |
| 7,349,660 B2 * | 3/2008 | Domoto et al. ................ 399/328 |
| 7,925,198 B2 * | 4/2011 | Urano ............................ 399/333 |
| 2004/0069404 A1 | 4/2004 | Kondoh |
| 2004/0265021 A1 | 12/2004 | Kinouchi et al. |
| 2005/0269065 A1 * | 12/2005 | Chen ........................ 165/104.26 |

(Continued)

FOREIGN PATENT DOCUMENTS
JP  53-106136  9/1978
(Continued)

OTHER PUBLICATIONS

Office Action (Decision of Appeal) dated Apr. 5, 2011, issued in the corresponding Japanese Patent Application No. 2008-223149, and an English Translation thereof.

(Continued)

*Primary Examiner* — Walter L Lindsay, Jr.
*Assistant Examiner* — Rodney Bonnette
(74) *Attorney, Agent, or Firm* — Buchanan, Ingersoll & Rooney PC

(57) ABSTRACT

In a manufacturing method of a heat equalizing member for a fixing device of the invention, first, an elongated cylindrical pipe is prepared which is made of a metallic material and which has one end sealed while the other end opened. Next, a heat-resistant releasing layer is formed on the outer face of the pipe in close contact therewith. Then, operating fluid is injected into the pipe from an outside through the other end of the pipe, while the other end is sealed by welding.

11 Claims, 3 Drawing Sheets

U.S. PATENT DOCUMENTS

| | | | |
|---|---|---|---|
| 2006/0014021 A1* | 1/2006 | Sugawara et al. | 428/421 |
| 2006/0140689 A1 | 6/2006 | Echigo et al. | |
| 2007/0003335 A1 | 1/2007 | de Jong et al. | |
| 2007/0074395 A1* | 4/2007 | Hou et al. | 29/890.032 |
| 2008/0124151 A1 | 5/2008 | Kagawa | |
| 2009/0317152 A1 | 12/2009 | Urano | |
| 2010/0054828 A1 | 3/2010 | Urano | |

FOREIGN PATENT DOCUMENTS

| | | |
|---|---|---|
| JP | 56-027886 | 3/1981 |
| JP | 03-164775 | 7/1991 |
| JP | 7-028351 A | 1/1995 |
| JP | 07-036303 | 2/1995 |
| JP | 07-064420 | 3/1995 |
| JP | 08-248797 | 9/1996 |
| JP | 09-179427 | 7/1997 |
| JP | 10-291045 | 11/1998 |
| JP | 2001-230065 | 8/2001 |
| JP | 2002-055552 | 2/2002 |
| JP | 2002-062752 | 2/2002 |
| JP | 2002-082569 | 3/2002 |
| JP | 2002-328559 | 11/2002 |
| JP | 2003-098877 | 4/2003 |
| JP | 2003-131504 | 5/2003 |
| JP | 2005-037859 | 2/2005 |
| JP | 2005-049455 | 2/2005 |
| JP | 2005-049812 | 2/2005 |
| JP | 2005-305809 | 11/2005 |
| JP | 2006-200775 | 8/2006 |
| JP | 2007-079238 | 3/2007 |
| JP | 2007-108212 | 4/2007 |
| JP | 2007-108213 | 4/2007 |
| JP | 2008-102403 | 5/2008 |
| WO | WO 00/05629 | 2/2000 |

OTHER PUBLICATIONS

Search Report dated May 2, 2011, issued in the corresponding European Patent Application No. 09010878.8-2209.

First Office Action dated Apr. 26, 2011, issued in the Chinese Patent Application No. 200910166830.0, and an English Translation thereof.

Office Action (Decision to Patent Grant) dated May 17, 2011, issued in the corresponding Japanese Patent Application No. 2008-159286, and an English Translation thereof.

Office Action (Preliminary Notice of Rejection) dated Jun. 15, 2010, issued in the corresponding Japanese Patent Application No. 2008-223149, and an English Translation thereof.

Office Action (Preliminary Notice of Rejection) dated Jun. 29, 2010, issued in the corresponding Japanese Patent Application No. 2008-159286, and an English Translation thereof.

Office Action (Preliminary Notice of Rejection) dated Jul. 6, 2010, issued in the corresponding Japanese Patent Application No. 2008-239538, and an English Translation thereof.

Partial European Search Report dated Sep. 6, 2010, issued in the corresponding European Patent Application No. 09007925.2-2209.

Office Action (Preliminary Notice of Rejection) dated Sep. 14, 2010, issued in the corresponding Japanese Patent Application No. 2008-159286, and an English Translation thereof.

Office Action (Notice of Final Rejection) dated Oct. 26, 2010, issued in the corresponding Japanese Patent Application No. 2008-223149, and an English Translation thereof.

Office Action (Preliminary Notice of Rejection) dated Feb. 8, 2011, issued in the corresponding Japanese Patent Application No. 2008-318328, and an English Translation thereof.

European Search Report dated Nov. 24, 2010, issued in the corresponding European Application No. 09007925.2-2209.

* cited by examiner

MANUFACTURING METHOD OF HEAT EQUALIZING MEMBER FOR FIXING DEVICE AND HEAT EQUALIZING MEMBER FOR FIXING DEVICE

This application is based on an application No. 2008-159286 filed on Jun. 18, 2008 in Japan, an application No. 2008-223149 filed on Sep. 1, 2008 in Japan, an application No. 2008-239538 filed on Sep. 18, 2008 in Japan, an application No. 2008-318328 filed on Dec. 15, 2008 in Japan, the entire contents of which are hereby incorporated by reference.

TECHNICAL FIELD

The present invention relates to a manufacturing method of a heat equalizing member for a fixing device, and more specifically relates to a method of manufacturing a heat equalizing member for use in a fixing device in an electrophotographic image forming apparatus (copying machine, printer and the like).

The invention also relates to such a heat equalizing member for a fixing device.

BACKGROUND ART

In the fixing devices used for image forming apparatuses such as electrophotographic copying machines and printers, rollers and belts with low heat capacity are often used as fixing members for heating and/or pressurizing conveyed sheets in order to reduce a warming up time. Although use of such rollers and belts with low heat capacity achieves quick temperature increase, heat transfer becomes difficult in the longitudinal direction of the rollers (width direction of the belts). Accordingly, heat pipes, which are made by enclosing operating fluid (such as water) in the pipes made of metal with sufficient heat conduction (such as copper and aluminum), are placed as heat equalizing members along the rollers and the belts, and are brought into pressure contact therewith. As a consequence, the latent heat of the operating fluid enclosed in the heat pipes is used to reduce temperature distribution difference in the longitudinal direction of the rollers (width direction of the belts), by which heat equalization is achieved.

SUMMARY OF INVENTION

Technical Problem

When a fixing member like the rollers and belts is directly brought into pressure contact with the heat pipe, toner and paper powder, which were offset in a minute amount during image fixation, attach as contamination on the surface of the heat pipe. As the toner and the paper powder are accumulated on the surface of the heat pipe, it becomes impossible to make uniform contact between the fixing member and the heat pipe, which deteriorates a heat equalizing effect. Moreover, the accumulated contamination may drop off and cause contamination of images on sheets.

One of the suggested solutions to this problem is to form a heat-resistant releasing layer made of fluororesin on the surface of the heat pipe to prevent contamination. In the case of providing such a heat-resistant releasing layer made of fluororesin, it is generally assumed to coat commercially available heat pipes with fluororesin and then perform calcination. However, this involves a risk since the internal pressure of the heat pipes may go up during the calcination, and the heat pipes may be exploded and damaged thereby. This may also damage the yield.

It has also been proposed to coat a reinforcement pipe, which is made of metal with high rigidity (such as stainless steel and iron), with a heat-resistant releasing layer made of fluororesin and to externally fit the reinforcement pipe over a heat pipe so as to be used as a heat equalizing member (JP H7-28351 A). However, in such a configuration, thermal conductivity of the entire heat equalizing member is deteriorated, which results in lowered heat equalizing capability. Moreover, since the excessive heat capacity of the reinforcement pipe is added to the heat pipe, heat capacity increases and a warming up time is prolonged thereby. Further, using the reinforcement pipe in addition to the heat pipe causes a problem of higher costs.

Solution to Problem

Accordingly, an object of the present invention is to provide a manufacturing method of a heat equalizing member for a fixing device capable of manufacturing a heat equalizing member for a fixing device safely with high yields and low costs, the heat equalizing member having the surface scarcely contaminated and having excellent heat equalizing capability and low heat capacity.

Another object of the invention is to provide a heat equalizing member for a fixing device, which has the surface scarcely contaminated and which has excellent heat equalizing capability and low heat capacity.

In order to achieve the above object, a manufacturing method of a heat equalizing member for a fixing device according to the present invention, comprises:

preparing an elongated cylindrical pipe which is made of a metallic material and which has one end sealed while the other end opened;

forming a heat-resistant releasing layer on an outer face of the pipe in close contact therewith; and injecting operating fluid into the pipe from an outside through the other end of the pipe, while sealing the other end by welding.

In this specification, the "heat-resistant releasing layer" refers to a layer having resistance to heat whose temperature is suitable for fixing by fixing devices and having a property to enable toners, paper powder and the like to detach more easily as compared with the metallic material of the pipe which serves as a base.

Moreover, the "operating fluid" refers to liquid (such as water) enclosed (or to be enclosed) in the pipe, which reduces the temperature distribution difference in the longitudinal direction of the pipe with the latent heat generated during evaporation and condensation.

Moreover, "welding" is a concept including brazing.

In the manufacturing method of a heat equalizing member for a fixing device of the present invention, the heat-resistant releasing layer is formed on the outer face of the internal area of the pipe, and then the operating fluid is injected into the pipe before the pipe is sealed. Consequently, even if calcination is performed during formation of the heat-resistant releasing layer, the pipe does not explode and damaged by increase in internal pressure of the pipe. Therefore, according to the manufacturing method, a heat equalizing member for a fixing device can be manufactured safely with sufficient yields. According to the manufacturing method, the number of component members is smaller than that in the conventional example (JP H7-28351 A) using a reinforcement pipe, and therefore a heat equalizing member for a fixing device can be manufactured at lower costs. Since the manufactured heat equalizing member has the heat-resistant releasing layer in its outermost circumference, contamination can scarcely attach to the surface thereof. Since the manufactured heat equalizing member has the pipe and the heat-resistant releasing layer in close contact with each other, its heat equalizing capability is excellent and heat capacity is small. Since the heat-resistant releasing layer of the heat equalizing member has resistance to the heat whose temperature is suitable for fixing by fixing devices, the heat equalizing member can stay in stable contact with the fixing member, which is for heating and/or pressurizing the sheets to be conveyed, over a long period of time. Therefore, the heat equalizing effect is stabilized and maintained.

A heat equalizing member for a fixing device according to the present invention, comprises:

an elongated cylindrical pipe made of a metallic material and having opposite ends sealed;

operating fluid enclosed in the pipe; and a heat-resistant releasing layer formed in close contact with the outer face of the pipe.

The heat equalizing member for a fixing device of the present invention has the heat-resistant releasing layer in an outermost circumference, so that contamination can scarcely attach to the surface thereof. Since the pipe and the heat-resistant releasing layer are in close contact with each other in the heat equalizing member, heat equalizing capability is excellent and heat capacity is small. Since the heat equalizing member has a smaller number of component members than the conventional example (JP H7-28351 A) using a reinforcement pipe, it can be manufactured at lower costs. Since the heat-resistant releasing layer has resistance to the heat of target temperature suitable for fixing by fixing devices, the heat equalizing member can stay in stable contact with the fixing member, which is for heating and/or pressurizing the sheet to be conveyed, over a long period of time. Therefore, the heat equalizing effect is stabilized and maintained.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DESCRIPTION OF EMBODIMENTS

Hereinbelow, the present invention will be described in detail in conjunction with the embodiments with reference to the drawings.

Figure 1:
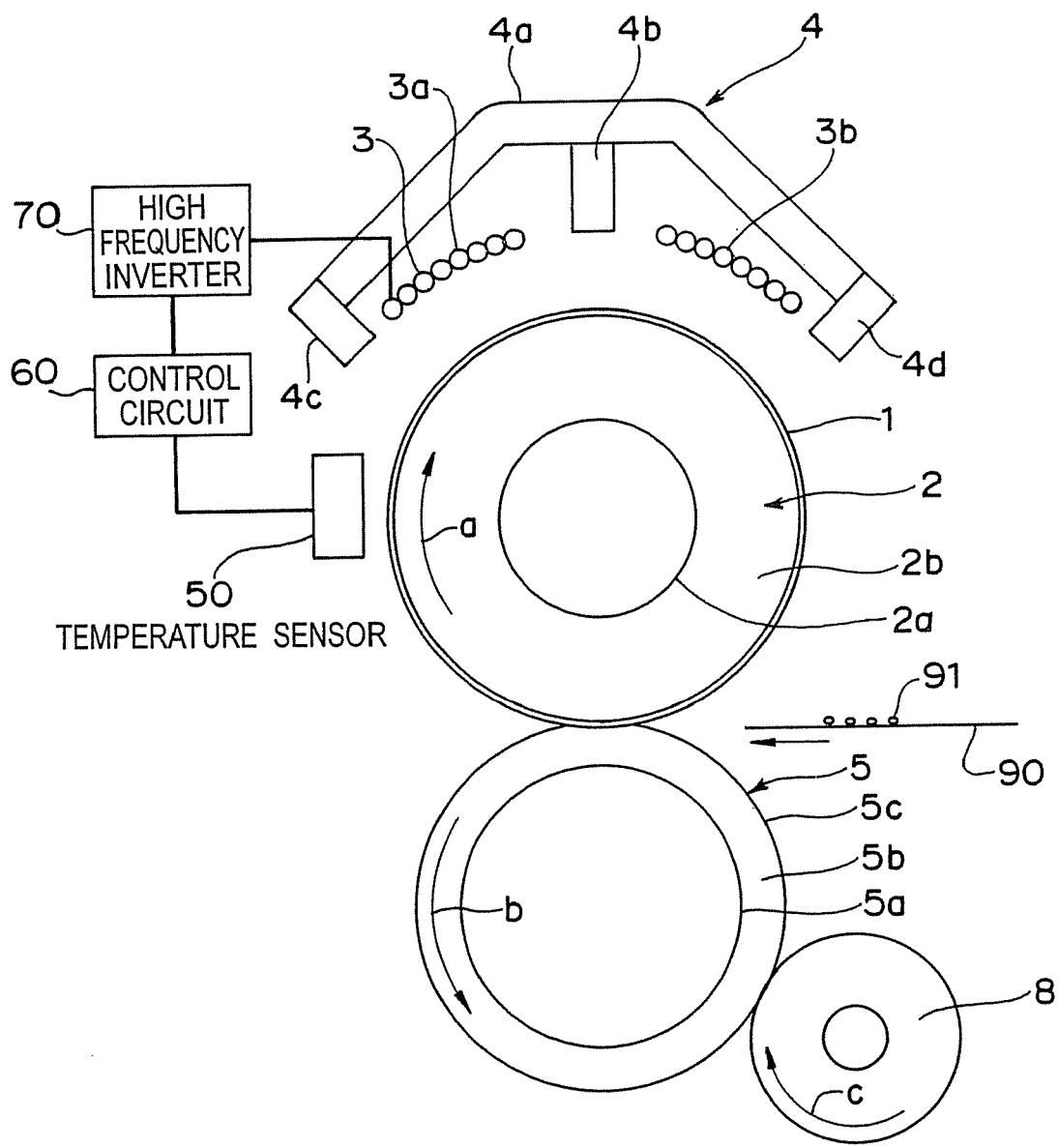
FIG. 1 is a view showing a cross sectional configuration of a fixing device having a heat equalizing member in one embodiment of the invention.

FIG. 1 is a view showing a cross sectional configuration of a fixing device having a heat equalizing member in one embodiment of the invention. This fixing device is used for fixing toner images onto sheets in electrophotographic image forming apparatuses (such as copying machines and printers). As shown in FIG. 1, the fixing device is generally composed of a fixing roller 2, a heating belt 1 for rotating around the fixing roller 2, a pressure roller 5, a heat equalizing member 8, an exciting coil 3, a magnetic body core 4, a temperature sensor 50, a control circuit 60, and a high-frequency inverter 70. Reference sign 90 refers to a paper sheet as a sheet.

The fixing roller 2, the pressure roller 5, and the heat equalizing member 8, which are cylindrical component members each extending vertically with respect to the page of FIG. 1, are placed in parallel with each other and the opposite ends of each member are rotatably supported by unshown bearing members.

In this example, the fixing roller 2 is composed of a core metal 2a made of stainless steel and a silicone sponge layer 2b with a thickness of 10 mm which covers the outer face of the core metal 2a. The diameter of the fixing roller 2 as a whole is set as 40 mm.

Although unshown in detail, the heating belt 1 is composed of a heat-generating layer which is made of a Ni belt with a thickness of 40 μm for generating eddy current by electromagnetic induction to generate heat, a heat-resistant elastic layer which is made of a silicone rubber layer with a thickness of 200 μm and which is formed on the surface of the heat-generating layer, and a heat-resistant releasing layer which is made of PFA (tetrafluoroethylene perfluoroalkyl vinyl ether copolymer) with a thickness of 30 μm for covering the surface of the heat-resistant releasing layer to prevent adhesion of toner and the like.

The pressure roller 5 is composed of a core metal 5a made of STKM (carbon steel tube for machine structural purposes) with a diameter of 35 mm, a heat-resistant elastic layer 5b made of two layers, a Si rubber layer and a Si sponge layer, and a heat-resistant releasing layer 5c made of PFA for covering the surface of the heat-resistant elastic layer 5b. The pressure roller 5 is biased by an unshown pressurizing mechanism using a spring and the like toward the fixing roller 2 with about 500N welding pressure. Thus, a nip section for fixing is formed between the pressure roller 5 and the heating belts 1 around the fixing roller 2, the nip section having a size of about 12 mm in the conveying direction of the paper sheet 90.

Figure 2A:
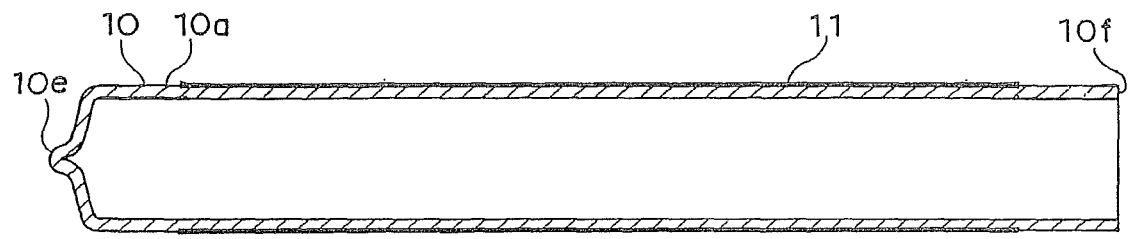
FIGS. 2A-2D are a flowchart showing the manufacturing steps for the heat equalizing member.
Figure 2B:
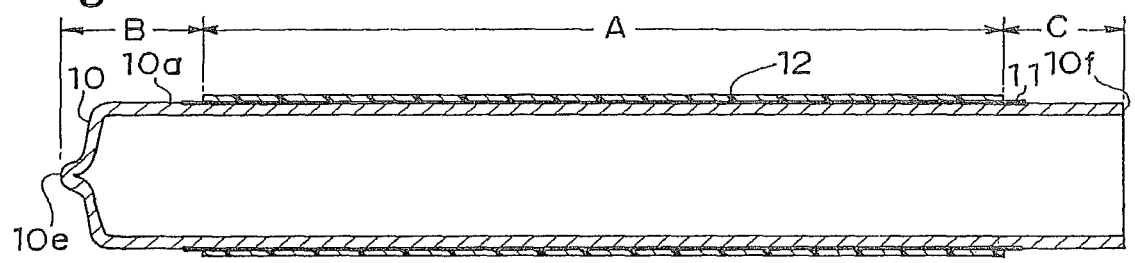
Figure 2C:
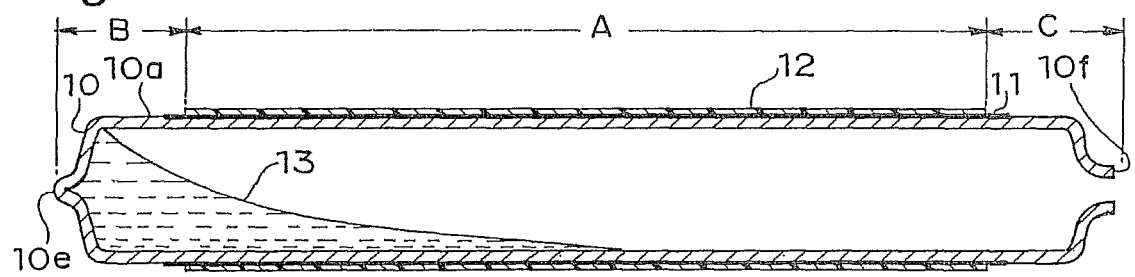
Figure 2D:
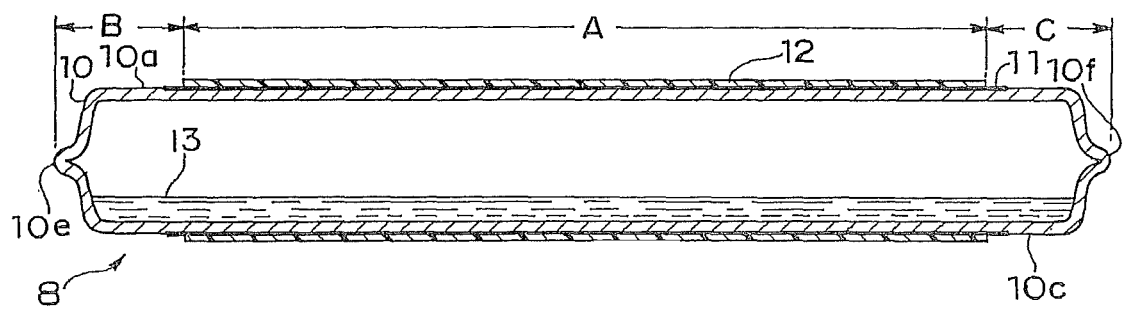

The heat equalizing member 8 is generally composed of, as shown in FIG. 2D, a cylindrical copper pipe 10 having water 13 as operating fluid enclosed therein, and a heat-resistant releasing layer 12 made of a PFA tube formed in close contact with the outer face of the copper pipe 10. The heat equalizing member 8 is biased toward the pressure roller 5 by an unshown pressurizing mechanism using a spring and the like.

The pressure roller 5 is rotated at a predetermined circumferential speed in the counter clockwise direction shown by arrow b in FIG. 1 with an unshown drive mechanism. The heating belt 1 rotates together with the fixing roller 2 in the clockwise direction shown by arrow a in FIG. 1 by following after the rotation of the pressure roller 5 due to frictional force with the pressure roller 5 in the nip section. The heat equalizing member 8 also rotates in the clockwise direction shown by arrow c in FIG. 1 by following after the rotation of the pressure roller 5 due to frictional force with the pressure roller 5.

The exciting coil 3 is provided for generating magnetic flux in response to electric power supply from the high-frequency inverter 70. The exciting coil 3 is formed by winding a lead wire bundle into the shape of an ellipse two or more times (about 10 times in this example) along with the longitudinal direction of the fixing roller 2. In FIG. 1, reference sign 3a shows an outward trip portion of the lead wire bundle and reference sign 3b shows a return trip portion of the lead wire bundle. It is to be noted that the one lead wire bundle is a publicly known strand (litz wire) with a diameter of about several mm which is formed by bundling 114 strands (copper wires of about 0.18 mm-0.20 mm in diameter with insulating coating of enamel) in order to enhance conducting efficiency.

The magnetic body core 4 is composed of a generally angle-shaped main core 4a placed along the outer circumference of the heating belt 1, a central core 4b projecting toward the heating belt 1 from a central section with respect to the circumferential direction of the main core 4a, and edge cores 4c and 4d each projecting toward the heating belt 1 from the opposite end sections with respect to the circumferential direction of the main core 4a. The central core 4b is positioned in a gap between the outward trip portion 3a and the return trip portion 3b of the exciting coil 3. The edge cores 4c and 4d cover the outer edges of the outward trip portion 3a and the return trip portion 3b of the exciting coil 3. Each component member of the magnetic body core 4 is made of MnZn-based ferrite. Accordingly, the magnetic flux generated by the exciting coil 3 forms a magnetic circuit starting from the central core 4b, passing through a left-hand portion of the main core 4a in FIG. 1, the edge core 4c and the heat-generating layer of the heating belt 1, and returning to the central core 4b. The magnetic flux also symmetrically forms a magnetic circuit starting from the central core 4b, passing through a right-hand portion of the main core 4a in FIG. 1, the edge core 4d and the heat-generating layer of the heating belt 1, and returning to the central core 4b. Thus, the magnetic flux passes along the heat-generating layer of the heating belt 1, and the magnetic flux alternates so that an eddy current is generated on the heat-generating layer to generate heat.

The temperature sensor 50 is, for example, a non-contact infrared temperature sensor, and is placed so as to face the outer face of heating belt 1 in close proximity. It is to be noted that a contact type thermistor may be used as the temperature sensor 50. The detection signal of the temperature sensor 50 is inputted into the control circuit 60. The control circuit 60 controls the high-frequency inverter 70 based on the detection signal of the temperature sensor 50 to increase or decrease the electric power supply from the high-frequency inverter 70 to the exciting coil 3 so that the surface temperature of the heating belt 1 can be kept at a target temperature suitable for fixing. As the temperature sensor 50, a thermostat and other instruments to ensure security may be used in place of the infrared temperature sensor.

At the time of fixing operation, the pressure roller 5 rotates counter clockwise in FIG. 1, and following after this rotation, the fixing roller 2 and the heating belt 1 rotate clockwise in FIG. 1. At the same time, automatic control is carried out so that the heat-generating layer of the heating belt 1 generates heat through electromagnetic induction by the magnetic flux generated by the exciting coil 3 and thereby the surface temperature of the heating belt 1 can be kept at the target temperature (about 180° C. in this example). In this state, a paper sheet 90 as a sheet with an unfixed toner image 91 formed on one side thereof is sent from the right side in FIG. 1 into the nip section composed of the heating belt 1 and the pressure roller 5 by an unshown conveying mechanism. The paper sheet 90 sent into the nip section is heated by the heating belt 1 while it passes through the nip section. As a result, the unfixed toner image 91 is fixed onto the paper sheet 90. The paper sheet 90 which passed through the nip section is discharged to the left side in FIG. 1. It is to be noted that the paper sheet 90 may be replaced with an OHP sheet and the like.

When small-size paper sheets are fed in succession, the heat in an area in the width direction of the heating belt 1 where the paper sheets do not come into contact (non-paper feed area) is not removed, and therefore heat tends to remain in the non-paper feed area of the heating belt 1 and the pressure roller 5, resulting in local temperature rise. As a solution, the heat equalizing member 8 removes the heat in the non-paper feed area of the heating belt 1 and the pressure roller 5, and equalizes the heat in the longitudinal direction of the heat equalizing member 8 with use of the latent heat of the enclosed operating fluid. This makes it possible to reduce temperature distribution difference in the width direction of the heating belt 1 (longitudinal direction of the pressure roller 5) and to achieve heat equalization.

Without the presence of the heat equalizing member 8, toner overmelts in the non-paper feed area and thereby high temperature offset may be generated, or uneven glossiness may be generated when large-size paper sheets are fed after feeding of the small-size paper sheets. If temperature rises further, peripheral component members of the fixing device may also melt.

As mentioned before in the conventional example, when the pressure roller is directly brought into pressure contact with the heat pipe, the toner and the paper powder, which were offset in a minute amount during image fixation, attach as contamination on the surface of the heat pipe. In the present embodiment, the heat-resistant releasing layer 12 made of PFA is provided on the outermost circumference of the heat equalizing member 8, so that contamination can scarcely attach to the surface.

Since a copper pipe 10 and the heat-resistant releasing layer 12 are in close contact with each other in the heat equalizing member 8, heat equalizing capability is excellent and heat capacity is small. Since the heat equalizing member 8 has a smaller number of component members than the conventional example (JP H7-28351 A) using a reinforcement pipe, it can be manufactured at lower costs. Moreover, since the heat-resistant releasing layer 12 has resistance to the heat of target temperature suitable for fixing (about 180° C. in this example), the heat equalizing member 8 can stay in stable contact with the pressure roller 5 over a long period of time. Therefore, the heat equalizing effect is stabilized and maintained.

FIGS. 2A-2D show the manufacturing steps for the heat equalizing member 8.

First, as shown in FIG. 2A, an elongated copper pipe 10 is prepared which has a left end 10e as one end being closed and a right end 10f as the other end being opened. In this example, the copper pipe 10 is an integrated product of 21 mm in diameter and 0.8 mm in thickness.

A primer 11 for enhancing the adhesive strength of the heat-resistant releasing layer described below is applied to the outer face 10a of the copper pipe 10. In this example, the primer 11 is made of a material formed by dispersing a binder component having adhesiveness to metal (such as acrylics, polyamidoimide, polyimide, poly phenylene sulphide, polyether sulphone and the like) and a fluororesin component having adhesiveness to fluororesin (such as polytetrafluoroethylene, tetrafluoroethylene perfluoroalkyl vinyl ether copolymers, tetrafluoroethylene hexafluoropropylene copolymers, and blends thereof). The material is generally used for bonding metal object and fluororesin.

Next, as shown in FIG. 2B, the heat-resistant releasing layer 12 made of PFA is formed in close contact with the outer face 10a of the copper pipe 10 (more specifically, with the outer face of the primer 11). In this example, the heat-resistant releasing layer 12 is formed by covering the outer circumference of the copper pipe 10 with a PFA tube and performing calcination at about 400° C.

In this case, the area for forming the heat-resistant releasing layer 12 is set to be only an internal area A of the copper pipe 10 excluding outer edge areas B and C at opposite end sides with respect to the longitudinal direction of the copper pipe 10. The internal area A is substantially equivalent to the area through which the maximum-size paper sheet expected in this fixing device passes.

It is to be noted that the area for applying the primer 11 is set to have a margin so as to be slightly larger than the internal area A with respect to the longitudinal direction of the copper pipe 10.

Next, as shown in FIG. 2C, crushing as the first plastic working is performed to reduce the diameter of the right end 10*f* of the pipe 10 (in this stage, the right end 10*f* is not yet closed). Next, water 13 as operating fluid is injected into the pipe 10 through the right end 10*f* with reduced diameter from the outside. In this case, since the diameter of the right end 10*f* of the pipe 10 has been reduced, the water 13 already injected in the pipe 10 is not easily spilled therefrom during and after injection of the water 13.

Next, as shown in FIG. 2D, an unshown vacuum pump is connected to the right end 10*f* of the pipe 10 to vacuum the inside of the pipe 10, and in this vacuumed state, crushing as the second plastic working is performed to close the right end 10*f* of the pipe 10 (preliminary sealing).

Next, the vacuum pump is removed, and then brazing as welding is performed to seal the right end 10*f* of the pipe 10 (main sealing).

Figure 3:
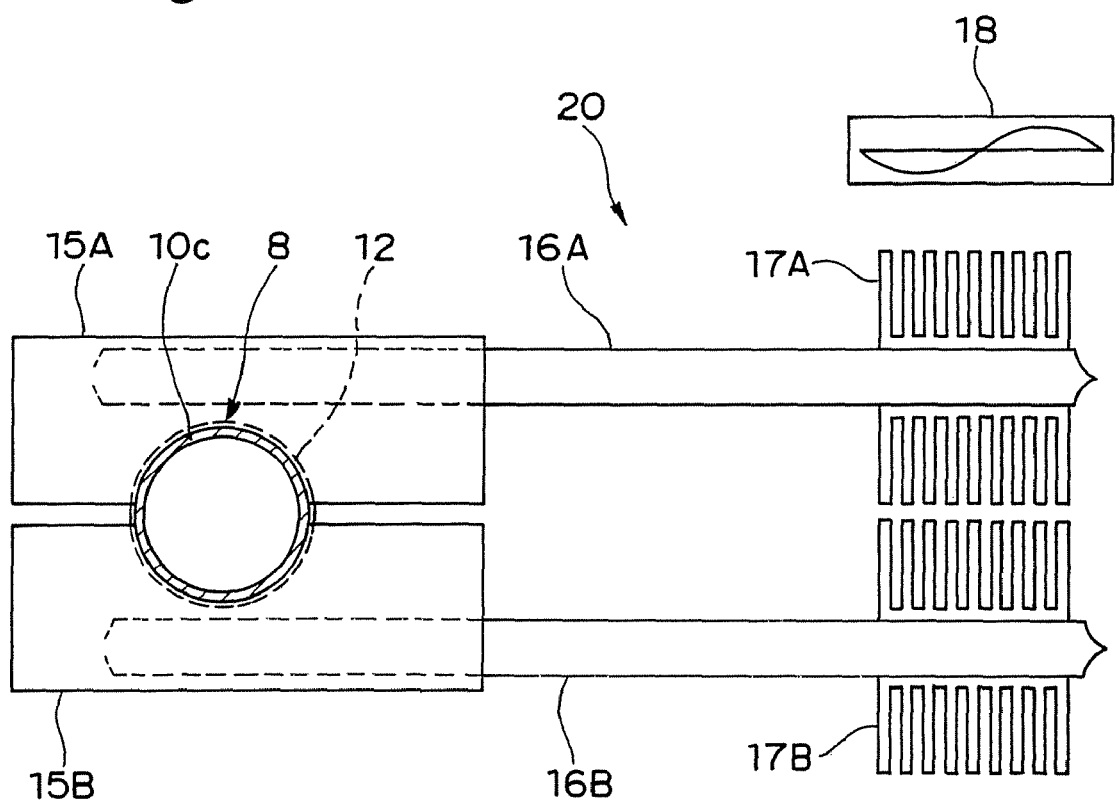
FIG. 3 is a view showing a way of air cooling with use of a heat sink tool.

In the case of sealing the right end 10*f* of the pipe 10 by welding, the heat of the welding may increase the temperature of the pipe 10, which may deteriorate or damage the heat-resistant releasing layer 12 if no measure is devised. Accordingly, in the present embodiment, heat is radiated with use of the heat sink tool 20 during welding as shown in FIG. 3.

More specifically, the heat sink tool 20 includes a pair of fixtures 15A, 15B for holding and fixing an outer edge area C of the right end 10*f* side of the pipe 10 (more precisely, a portion 10*c* left behind with the original outer diameter in the outer edge area C) from both sides, a pair of cooling heat pipes 16A, 16B, whose one ends are respectively inserted into the fixtures 15A, 15B, and a pair of heat sinks 17A, 17B attached to the other end sides of the cooling heat pipes 16A, 16B.

The fixtures 15A, 15B and the heat sinks 17A, 17B are made of components with sufficient thermal conductivity such as aluminum and copper. The surfaces of the fixtures 15A, 15B on the pipe 10 side are formed into curved surfaces with the same curvature as the original outer diameter of the pipe 10 so as to enlarge the contact area with the pipe 10. The heat sinks 17A, 17B have a large number of fins so as to enlarge the surface area. The cooling heat pipes 16A, 16B are made of cylindrical copper pipes with the water as operating fluid enclosed therein.

In welding operation, the portion 10*c* in the outer edge area C of the right end 10*f* side of the pipe 10, which is left behind with the original outer diameter, is held by the fixtures 15A, 15B from both sides and fixed therein. The heat sinks 17A, 17B are cooled with a cooling fan 18. In this state, as shown in FIG. 2D, the right end 10*f* of the pipe 10 is sealed by welding (brazing). The heat of the welding is transported from the right end 10*f* of the pipe 10 to the portion 10*c* left behind with the original outer diameter, the fixtures 15A, 15B, the cooling heat pipes 16A, 16B, and the heat sinks 17A, 17B. With the aid of the cooling fan 18, the heat is efficiently radiated into atmosphere from the heat sinks 17A, 17B. In this way, the temperature of the internal area A of the pipe 10 is kept below about 260° C. which is the temperature that the heat-resistant releasing layer 12 can withstand. Therefore, it becomes possible to prevent the heat-resistant releasing layer 12 of the heat equalizing member 8 from being deteriorated by the heat of welding, and to prevent the pipe 10 from being broken and damaged resulting from an increase in internal pressure of the pipe 10.

Although air cooling is performed with the heat sink tool 20 in this example, the invention is not limited thereto. For example, as a means to radiate the heat of welding, a coolant circulation pipe going through the fixtures 15A, 15B may be provided to perform water cooling and oil cooling with use of water and oil.

In the aforementioned example, the heat-resistant releasing layer 12 was formed by covering the outer circumference of the copper pipe 10 with a PFA tube and by performing calcination. It should naturally be understood that the present invention is not limited to this example.

For example, the heat-resistant releasing layer 12 may be formed by applying the powder electrostatic coating of the fluororesin to the outer face of the internal area A of the pipe 10 and then calcinating the fluororesin.

The heat-resistant releasing layer 12 may also be formed by applying a dispersion paint, which is constituted of fluororesin powder dispersed into water, to the outer face of the internal area A of the pipe 10 and then calcinating the dispersion paint.

The heat-resistant releasing layer 12 may also be formed by soaking the outer face of the internal area A of the pipe 10 in melt fluororesin to attach the fluororesin around the outer face, making the thickness of the fluororesin attached around the outer face uniform with a thickness control blade, and then calcinating the fluororesin.

The heat-resistant releasing layer 12 may also be formed by coating the outer face of the internal area A of the pipe 10 with melt fluororesin with use of a roll coater and then calcinating the fluororesin.

In the above-mentioned example, although the material of the pipe 10 was copper, aluminum and other materials may be used instead. As a material of the pipe 10, metallic materials with good thermal conductivity and a certain level of rigidity are preferable.

In the above-mentioned example, although the material of the heat-resistant releasing layer 12 was PFA, the material is not limited thereto. The material of the heat-resistant releasing layer 12 may be fluororesin such as PTFE (polytetrafluoroethylene), FEP (tetrafluoroethylene hexafluoropropylene copolymer), and PFEP (perfluoro ethylene hexafluoropropylene copolymer) in addition to PFA. Since these are fluororesins, they are excellent in heat resistance and releasability, and inexpensive. Their use, therefore, is desirable.

As is already described, a manufacturing method of a heat equalizing member for a fixing device according to the present invention, comprises:

preparing an elongated cylindrical pipe which is made of a metallic material and which has one end sealed while the other end opened;

forming a heat-resistant releasing layer on an outer face of the pipe in close contact therewith; and injecting operating fluid into the pipe from an outside through the other end of the pipe, while sealing the other end by welding.

In the manufacturing method of the heat equalizing member for a fixing device in one embodiment, after formation of the heat-resistant releasing layer and before injection of the operating fluid, first plastic working is performed to reduce a diameter of the other end of the pipe.

In the manufacturing method of the heat equalizing member for a fixing device in this embodiment, the operating fluid already injected is not easily spilled from the pipe during and after injection of the operating fluid.

In the manufacturing method of the heat equalizing member for a fixing device in one embodiment, when the other end of the pipe is sealed, second plastic working is performed to close the other end of the pipe before the welding is performed.

In the manufacturing method of the heat equalizing member for a fixing device in this embodiment, the diameter of the other end of the pipe is reduced by the first plastic working, so that the other end of the pipe can easily be closed in the second plastic working.

In the manufacturing method of the heat equalizing member for a fixing device in one embodiment, an area on the outer face of the pipe where the heat-resistant releasing layer is formed is only an internal area excluding outer edge areas at opposite end sides of the pipe with respect to a longitudinal direction of the pipe, and when the welding is performed, a heat sink tool is brought into contact with the outer edge area on the other end side of the pipe, so that heat is radiated from the outer edge area through the heat sink tool.

In this specification, the "outer edge areas" of the pipe are equivalent to areas other than the internal area through which the maximum-size sheet (recording medium) expected in the fixing device employing the heat equalizing member for a fixing device passes, i.e., the areas which do not contribute to fixing of toner images.

In the manufacturing method of the heat equalizing member for a fixing device in this embodiment, when the welding is performed, a heat sink tool is brought into contact with the outer edge area on the other end side of the pipe, so that heat is radiated from the outer edge area through the heat sink tool. Therefore, it becomes possible to prevent the heat-resistant releasing layer of the heat equalizing member from being deteriorated by the heat of the welding, and to prevent the pipe from being broken and damaged resulting from an increase in internal pressure of the pipe.

In the manufacturing method of the heat equalizing member for a fixing device in one embodiment, formation of the heat-resistant releasing layer is performed by applying powder electrostatic coating of the fluororesin to the outer face of the internal area of the pipe and then calcinating the fluororesin.

In the manufacturing method of the heat equalizing member for a fixing device in this embodiment, the heat-resistant releasing layer is formed easily.

In the manufacturing method of the heat equalizing member for a fixing device in one embodiment, formation of the heat-resistant releasing layer is performed by applying a dispersion paint, which is constituted of fluororesin powder dispersed into water, to the outer face of the internal area of the pipe and then calcinating the dispersion paint.

In the manufacturing method of the heat equalizing member for a fixing device in this embodiment, the heat-resistant releasing layer is formed easily.

In the manufacturing method of the heat equalizing member for a fixing device in one embodiment, formation of the heat-resistant releasing layer is performed by covering the outer face of the internal area of the pipe with a tube made of fluororesin and then calcinating the tube.

In the manufacturing method of the heat equalizing member for a fixing device in this embodiment, the heat-resistant releasing layer is formed easily.

In the manufacturing method of the heat equalizing member for a fixing device in one embodiment, formation of the heat-resistant releasing layer is performed by soaking the outer face of the internal area of the pipe in melt fluororesin to attach the fluororesin around the outer face, making a thickness of the fluororesin attached around the outer face uniform with a thickness control blade, and then calcinating the fluororesin.

In the manufacturing method of the heat equalizing member for a fixing device in this embodiment, the heat-resistant releasing layer is formed easily.

In the manufacturing method of the heat equalizing member for a fixing device in one embodiment, formation of the heat-resistant releasing layer is performed by coating the outer face of the internal area of the pipe with melt fluororesin with use of a roll coater and then calcinating the fluororesin.

In the manufacturing method of the heat equalizing member for a fixing device in this embodiment, the heat-resistant releasing layer is formed easily.

As is already described, a heat equalizing member for a fixing device according to the present invention, comprises:
an elongated cylindrical pipe made of a metallic material and having opposite ends sealed;
operating fluid enclosed in the pipe; and
a heat-resistant releasing layer formed in close contact with the outer face of the pipe.

In the heat equalizing member for a fixing device in one embodiment, the heat-resistant releasing layer is formed only in an internal area excluding outer edge areas at opposite end sides of the pipe with respect to a longitudinal direction of the pipe.

In the heat equalizing member for a fixing device in this embodiment, the heat-resistant releasing layer is formed only in the internal area of the pipe excluding the outer edge areas at the opposite end sides with respect to the longitudinal direction of the pipe, and therefore when the pipe is sealed, the heat sink tool is brought into contact with the outer edge area, so that heat can be radiated from the outer edge area through the heat sink tool. In such a case, it becomes possible to prevent the heat-resistant releasing layer from being deteriorated by the heat of welding, and to prevent the pipe from being broken and damaged resulting from an increase in internal pressure of the pipe.

In the heat equalizing member for a fixing device in one embodiment, the heat-resistant releasing layer is made of fluororesin.

In the heat equalizing member for a fixing device in this embodiment, since the material of the heat-resistant releasing layer is fluororesin, it is excellent in heat resistance and releasability, and inexpensive.

Although the present invention has been described in detail, it is apparent that numerous modifications may be made. It should be understood that unless departing from the spirit and scope of the invention, such modifications that will be apparent to those skilled in the art are intended to be embraced in the scope of the appended claims.

The invention claimed is:

1. A manufacturing method of a heat equalizing member for a fixing device, comprising:
preparing an elongated cylindrical pipe which is made of a metallic material and which has one end sealed while the other end opened;
forming a heat-resistant releasing layer on an outer face of the pipe in close contact therewith;
injecting operating fluid into the pipe from an outside through the other end of the pipe, before sealing the other end by welding; and
wherein the heat-resistant releasing layer is formed on the outer face of the pipe before the other end of the pipe is sealed by welding.

2. The manufacturing method of a heat equalizing member for a fixing device according to claim 1, wherein after formation of the heat-resistant releasing layer and before injection of the operating fluid, first plastic working is performed to reduce a diameter of the other end of the pipe.

3. The manufacturing method of a heat equalizing member for a fixing device according to claim 2, wherein when the other end of the pipe is sealed, second plastic working is performed to close the other end of the pipe before the welding is performed.

4. The manufacturing method of a heat equalizing member for a fixing device according to claim 1, wherein
an area on the outer face of the pipe where the heat-resistant releasing layer is formed is only an internal area excluding outer edge areas at opposite end sides of the pipe with respect to a longitudinal direction of the pipe, and wherein
when the welding is performed, a heat sink tool is brought into contact with the outer edge area on the other end side of the pipe, so that heat is radiated from the outer edge area through the heat sink tool.

5. The manufacturing method of a heat equalizing member for a fixing device according to claim 1, wherein formation of the heat-resistant releasing layer is performed by applying powder electrostatic coating of the fluororesin to the outer face of the internal area of the pipe and then calcinating the fluororesin.

6. The manufacturing method of a heat equalizing member for a fixing device according to claim 1, wherein formation of the heat-resistant releasing layer is performed by applying a dispersion paint, which is constituted of fluororesin powder dispersed into water, to the outer face of the internal area of the pipe and then calcinating the dispersion paint.

7. The manufacturing method of a heat equalizing member for a fixing device according to claim 1, wherein formation of the heat-resistant releasing layer is performed by covering the outer face of the internal area of the pipe with a tube made of fluororesin and then calcinating the tube.

8. The manufacturing method of a heat equalizing member for a fixing device according to claim 1, wherein formation of the heat-resistant releasing layer is performed by soaking the outer face of the internal area of the pipe in melt fluororesin to attach the fluororesin around the outer face, making a thickness of the fluororesin attached around the outer face uniform with a thickness control blade, and then calcinating the fluororesin.

9. The manufacturing method of a heat equalizing member for a fixing device according to claim 1, wherein
formation of the heat-resistant releasing layer is performed by coating the outer face of the internal area of the pipe with melt fluororesin with use of a roll coater and then calcinating the fluororesin.

10. The manufacturing method of a heat equalizing member for a fixing device according to claim 1, further comprising heating the heat-resistant releasing layer to bond the heat-resistant releasing layer with the outer face of the pipe before the other end of the pipe is sealed by welding.

11. The manufacturing method of a heat equalizing member for a fixing device according to claim 10, wherein the heat-resistant releasing layer is heated to at least 400° C.

* * * * *